No Printed Specification Available
8362X
J. A & H. A. Pitt,
Horse Power.
Patented Aug. 15, 1834.
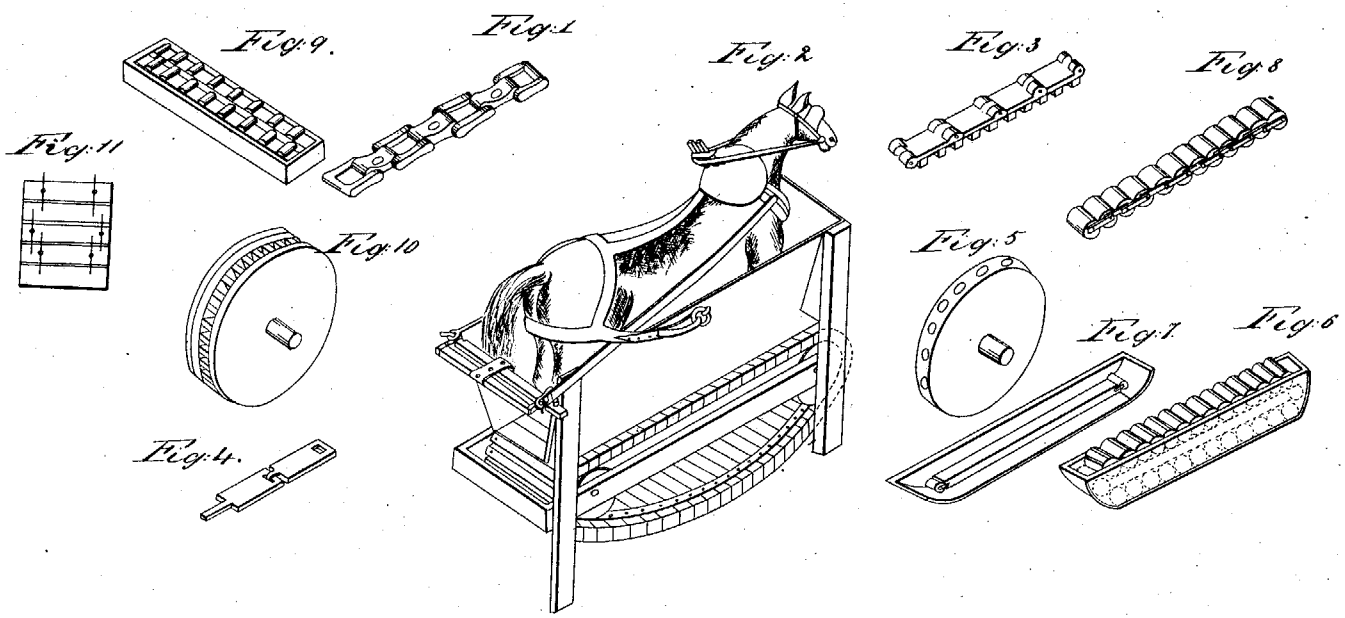
AM. PHOTO-LITHO. CO. N.Y. (OSBORNE'S PROCESS)

John A. Pitts & Hiram A Pitts

Pitts's endless chain and cogband

The Schedule referred to in these Letters Patent; and making part of the same, containing a description in the words of the said John A. Pitts & Hiram A Pitts themselves of their improvement in the chain band for horse powers, which they call Pitts endless chain and cog band.

To all persons to whom these Presents shall come John A Pitts of Winthrop, county of Kennebec and state of Maine and Hiram A. Pitts of Livermore, county of Oxford and State of Maine - Gentl.^m send greeting - Be it known, that we the said John A Pitts & Hiram A Pitts, have invented, made, constructed and applied to use, a new and useful improvement in the endless chain for horse powers called - Pitts's endless chain and cogband, specified in the words following to wit; We have the following several methods of constructing our chain. 1/ We make two chains similar to the flat chains used in common carding machines only larger and stouter See fig. 1. The square or open link may be made of round iron rod of any convenient size according to the strength needed - The flat link may be made of thick, stout nail plate - Upon the flat links we fasten by bolts or otherwise, lags or slats of wood, of such thickness, length and breadth, as will make the band of the required size - The two ends of this band being connected, the band then passes over two cogwheels or drums, and thus the machine is ready to receive the horse or other animal as represented in Fig 2. Sec.^d Another method of constructing our chain is represented in Fig 3 - Links of cast iron are made with eyes and sockets at the end so as to bolt together and form hinges and on the other side are cogs. The bands being bolted to the lags or slats of wood, are placed over cogwheels or drums, but the wheels or drums have shoulders or a rim projecting above the cogs on each side - The lags rest upon these shoulders or projections and thereby prevent the teeth of the cogs in the band from passing down too far, and causing toomuch friction in passing over the drums See fig 10. Third. Another method in which we construct our band is, by taking strips of iron plate of suitable length, cutting a tongue in one end and a square eye or orifice in the other, then connect them by doubling over the tongue of one into the eye of the other See Fig 4. This chain is then bolted on to the lags - The bolts used for this purpose have heads of a suitable length and size, and projecting above the plate of chain, serve as cogs This kind of chain we put over a wheel or drum hooped with iron and having holes at suitable intervals on the periphery or circumference which admit the heads of the bolts See fig 5.

4thly In order to prevent the chain from sagging, when the horse or any other animal is upon it, we have adopted the following invention. We make a box, see fig 6 of the length necessary - This box may be made in the following manner - Take two pieces of stout plank of proper width, round off the corners of the lower edge, take another piece of plank, three or four feet wide and fasten it horizontally midway between the two sides on the lower edge or for the bottom and ends nail on a strip of iron plate; this box then resembles a little flat bottomed boat with a deck or partition half way down - This partition or deck is shorter than the box and there is a space at each end of it between it and the sheet of iron at the ends or at each end of the partition we attach a roller see fig 7. which is a longitudinal section of the box or trough showing the partition and the rolls at the end of it - This box we fill with little Cylinders enough to fill the spaces above and below the horizontal partition, and keep in contact with each other See fig. 6. These Cylinders are sufficiently large in diameter to rise a little above the sides of the box - We place boxes (generally two of them) under the chain of lags so that the lags in passing from drum to drum press upon the surface of these cylinders which prevent the chain from sagging and assist it also by their sliding and changing places one with the other; being alternately above and below the deck or horizontal partition - Sometimes we connect these cylinders by pieces of iron fastened to little gudgeons projecting from the centres -
These serve merely to keep them at a proper distance from each other, but
they do not press any on the axles but wholly upon the surface of the Cy-
linders - These Cylinders may be made of wood or they may be made
by forming a ring of cast or wrought iron, turned smoothly and filled
up with wooden plugs or cylinders, see fig 8. Fifth<sup></sup>ly we sometimes in-
stead of the above system of cylinders, use the following method to
prevent sagging which we call the rack rolls; two grooves or channels
are made in a piece of timber see fig. 9 In each of these Grooves we
place friction rolls, so that the gudgeons or axles of one set alternate
with those of the other. This rack being put under the lags, presents
an even surface on which they rest as they pass from drum to drum
when in motion - Sixthly We also sometimes use the following meth
to prevent sagging Viz: Two flat rods of iron are screwed on to
each lag one at each end - The ends of these pass over and rest upon
the lags adjoining each side of the lag to which they are screwed
Fig. 11.

What we specifically claim as our invention and for what
we ask an exclusive right is 1) Our mode of connecting lags by
two or more flat link endless chains as above described -
Fig.s 1. and 4. Secondly) The mode of connecting lags by an endless cog
chain as above described Fig 3. Thirdly) Our mode of connecting lags
by the flat link chain using the bolt heads for cogs, as above described
Fig. 5 Fourthly Our system of surface rolls as applied to this or
any other chain, to prevent sagging, as above made and described
Fig.s 6. 7 & 8. Fifthly Our system of rack rolls as applied to
the purpose of preventing the chain from sagging Fig. 9.
Sixthly Our System of rods affixed to the lags as represented in
Fig. 11.

In testimony that the above is a true specification of
our several improvements as above described we have here-
unto set our hands this 18th day of March A.D. 1834.
Witnesses
Saml. B. Benson
F. Holmes
[(1261 words)]
sig. John A. Pitts
Hiram A. Pitts
[Exd. [illegible]]
(Patented 15 August 1834)